J. E. PARKER & D. B. WINTER.
MEANS FOR ATTACHING ELECTRICAL APPLIANCES TO CONDUIT OUTLET BOXES.
APPLICATION FILED JULY 27, 1911. RENEWED SEPT. 26, 1916.
1,224,316.
Patented May 1, 1917.
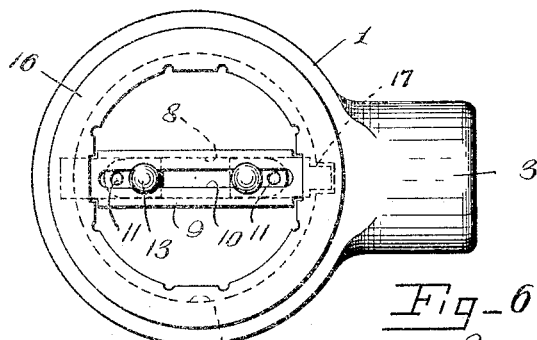
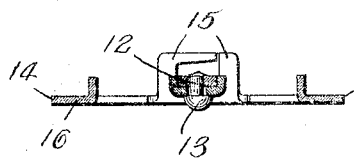
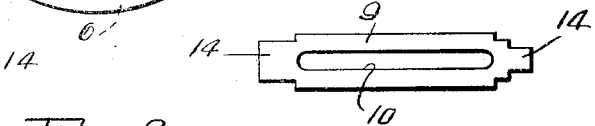
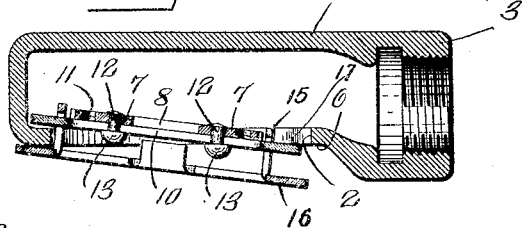
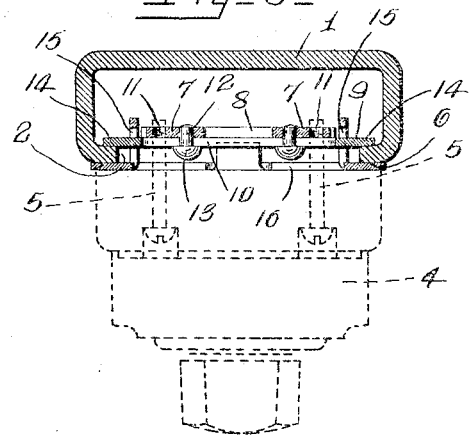
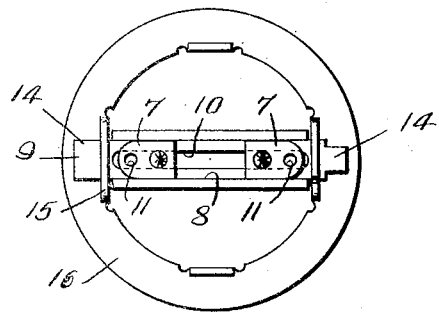

UNITED STATES PATENT OFFICE.

JOHN E. PARKER AND DANIEL B. WINTER, OF SYRACUSE, NEW YORK, ASSIGNORS TO CROUSE-HINDS COMPANY, OF SYRACUSE, NEW YORK, A CORPORATION OF NEW YORK.

MEANS FOR ATTACHING ELECTRICAL APPLIANCES TO CONDUIT OUTLET-BOXES.

1,224,316. Specification of Letters Patent. Patented May 1, 1917.

Application filed July 27, 1911, Serial No. 640,747. Renewed September 26, 1916. Serial No. 122,318.

*To all whom it may concern:*

Be it known that we, JOHN E. PARKER and DANIEL B. WINTER, of Syracuse, in the county of Onondaga and State of New York, have invented a certain new and useful Means for Attaching Electrical Appliances to Conduit Outlet-Boxes, of which the following is a specification.

This invention has for its object the production of means for attaching electrical appliances to conduit outlet boxes; and it consists in the combinations and constructions hereinafter set forth and claimed.

In describing this invention reference is had to the accompanying drawing in which like characters designate corresponding parts in all the views.

Figure 1 is a plan of one form of conduit outlet box provided with a preferable embodiment of our invention.

Fig. 2 is a sectional view of parts seen in Fig. 1, the means for attaching an electrical appliance to the conduit outlet box being shown in one of its positions occupied while being secured to the box.

Fig. 3 is a sectional view taken at a right angle to Fig. 2, an electrical appliance being shown in dotted lines.

Fig. 4 is an inverted plan of the attaching means.

Fig. 5 is a sectional view through the attaching means.

Fig. 6 is a plan of the detached bridge piece of the attaching means.

In the various makes of electrical appliances as switches, the fastening members or screws are not located the same distance apart or the same distance from the centers of the appliances, and in order to adapt the supports for such appliances to the fastening screws of the different makes, it has been the practice to bore a plurality of pairs of holes to accommodate the fastening members of the various makes of switches, such holes being located different distances from the center of the support and the holes of each pair being located on diametrically opposite sides of the center.

If, as is sometimes the case, a manufacturer of electrical appliances changes the positions of the fastening members or screws, there will be no pair of screw holes spaced the right distance apart to receive the screws of the new appliance. If by any chance a screw hole of one pair and a screw hole of another pair are spaced the right distance to receive the screws of the new appliance, the appliance will be eccentrically mounted on its support and will present a displeasing appearance to the eye.

Our means for attaching electrical appliances to conduit outlet boxes comprises, an adjustable part or parts adapted to receive the fastening members of different electrical appliances in which the fastening members are differently placed with respect to the centers of the appliances.

1 is the conduit outlet box which may be of any desirable form, size and construction, the same being here shown as having an opening 2 in one side thereof, and an internally threaded nipple 3 for connection with the conduit inclosing the electrical wires.

4 is one form of an electrical appliance as a switch, such appliance having fastening members 5, as screws, by which the appliance may be attached to its support. In the various makes of switches the screws are spaced different distances apart.

The means for attaching the electrical appliances to the box includes parts for coacting with the fastening members or screws 5 and at least one of such parts and preferably both being adjustable to different positions between the center of the opening 2 and the edge of the margin 6 around said opening 2. Said adjustable parts are usually nuts 7 movable in a guide groove 8 extending lengthwise of a support or bridge piece 9 extending across the opening 2, the nuts 7 having their opposite side faces slidably engaging the side walls of the groove 8 in order to prevent turning of the nuts. Said bridge piece is formed with a lengthwise slot 10 opening through the bottom of the guide groove 8.

The threaded screw holes 11 of the nuts 7 are alined with the slot 10 and the nuts are also provided with means for securing them to the bridge piece 9, said means consisting of a pin 12 secured at one end to each nut and having its opposite end provided with a head 13 engaging the face of the bridge piece 9 opposite to that formed with the groove.

Preferably the groove 8 is formed in the inner side of the bridge piece and the heads 13 engage the outer face thereof.

Said bridge piece is provided with tongues 14 at its opposite ends for interlocking with the inner face of the margin 6 of the wall around the opening 2, and is supported and movable in suitable guides 15 extending through the opening 2 from the body 16 of the attaching means. Said body is here shown as an annular plate resting on the outer face of the margin of the wall around the opening 2, the bridge piece 9 being movable in order to clamp the tongues 14 on the inner face of said margin, during the screwing of the fastening screws 5 into the nuts 7. The manner of assembly of the bridge piece 9 and the body 16 forms no part of this invention.

In operation the electrical appliance or switch is first attached to the bridge piece by adjusting the nuts 7 the proper distance apart to accommodate the screws 5 of the appliance, and one of the tongues 14 at one end of the bridge piece 9 is inserted under the margin 6, Fig. 2, while the other lug 14 is alined with a notch 17 in the margin 6, preliminary to being moved through such notch to the inner side of the margin in position to be turned slightly to interlock with such margin. After the attaching means have been placed in position on the base the fastening screws 5 are additionally tightened for moving the bridge piece 9 toward the inner face of the margin and thereby clamping the attaching means in position.

What we claim is:

1. Means for attaching to conduit outlet boxes having openings, electrical appliances having fastening members located at different distances from their centers, said means comprising a supporting member having a slot, and a nut in the slot, the nut having surfaces slidably engaging the side walls of the slot, whereby the nut is held from turning, substantially as and for the purpose described.

2. Means for attaching to conduit outlet boxes having openings, electrical appliances having fastening members located at different distances from their centers, said means comprising a supporting member having a slot, a nut in the slot, the nut having surfaces slidably engaging the side walls of the slot, whereby the nut is held from turning, the nut having means associated therewith extending through the slot and engaging the side of the supporting member opposite to that on which the nut is located for holding the nut from detachment from the support, substantially as and for the purpose specified.

3. Means for attaching to conduit outlet boxes having openings, electrical appliances having fastening screws spaced different distances apart, said means comprising a pair of nuts adjustable rectilinearly, and means for supporting the nuts and for holding the nuts from turning movement, the nuts being slidable rectilinearly along the supporting means, substantially as and for the purpose specified.

4. The combination with an electric conduit outlet box having an opening in one side thereof; of means adapted to attach to the box electrical appliances having fastening members located different distances from their centers, said means being arranged in the opening and being formed with a guide groove in one side thereof, and a slot opening through the bottom of the groove, and a nut adjustable in the groove and having a threaded opening alined with the slot, substantially as and for the purpose described.

5. Means for attaching to conduit outlet boxes having openings, electrical appliances having fastening members located different distances from their centers, said means comprising a supporting member adapted to extend crosswise of the opening of the box, and a part slidable rectilinearly along the supporting member for coacting with the fastening member of an electrical appliance, the supporting member being formed with a lengthwise slot through which the fastening member projects, and means coacting with said slidable part and the fastening member for holding said part in its adjusted position, the last-mentioned means extending through the slot, substantially as and for the purpose set forth.

6. Means for attaching to conduit outlet boxes having openings, electrical appliances having fastening screws located different distances from their centers, said means comprising a supporting member formed with a guide groove, and with a slot in the bottom of the guide groove, and a pair of nuts located in the groove and engaging the side walls of the groove, the nuts being adjustable along the slot and having their threaded openings alined with the slot, substantially as and for the purpose specified.

7. The combination with an electric conduit outlet box having an opening in one side thereof; of means adapted to attach to the box electrical appliances having fastening screws spaced different distances apart, said means comprising a bridge piece extending across the opening, and formed with a lengthwise guide groove on its inner face, and with a lengthwise slot extending through the bottom of the groove, a pair of nuts, one being slidable in the groove and having its threaded opening alined with the slot, substantially as and for the purpose described.

8. The combination with an electric conduit outlet box having an opening in one side thereof; of means adapted to attach to the box electrical appliances having fastening screws spaced different distances apart, said means comprising a bridge piece extending across the opening, and formed with a guide groove on its inner face and with a lengthwise slot extending through the bottom of the groove, a pair of nuts slidable in the groove and having their threaded openings alined with the slot, the nuts also having means extending through the slot and engaging the outer face of the bridge piece, substantially as and for the purpose specified.

In testimony whereof, we have hereunto signed our names in the presence of two attesting witnesses, at Syracuse, in the county of Onondaga, in the State of New York, this 7th day of July 1911.

JOHN E. PARKER.
DANIEL B. WINTER.

Witnesses:
C. C. SCHOENECK,
WM. CORNELL BLANDING.

Copies of this patent may be obtained for five cents each, by addressing the "Commissioner of Patents, Washington, D. C."